United States Patent [19]

Lee et al.

[11] 4,353,714
[45] Oct. 12, 1982

[54] POLYCRYSTALLINE SILICON-BONDED CUBIC BORON NITRIDE BODY AND METHOD

[75] Inventors: Minyoung Lee, Schenectady; Lawrence E. Szala, Scotia, both of N.Y.

[73] Assignee: General Electric Company, Schenectady, N.Y.

[21] Appl. No.: 315,332

[22] Filed: Oct. 26, 1981

[51] Int. Cl.³ .............................................. B24B 1/00
[52] U.S. Cl. ...................................... 51/295; 264/60; 51/307; 51/309
[58] Field of Search ................. 51/295, 307, 308, 309; 264/60

[56] References Cited

U.S. PATENT DOCUMENTS

| | | | |
|---|---|---|---|
| 3,982,911 | 9/1975 | Lee | 51/307 |
| 4,011,064 | 3/1977 | Lee et al. | 51/295 |
| 4,063,907 | 12/1977 | Lee et al. | 51/295 |
| 4,124,401 | 11/1978 | Lee et al. | 106/44 |
| 4,168,957 | 9/1979 | Lee et al. | 51/309 |
| 4,220,455 | 9/1980 | Pierre | 51/295 |
| 4,220,677 | 9/1980 | Fedoseev et al. | 427/215 |
| 4,242,106 | 12/1980 | Morelock | 51/295 |
| 4,247,304 | 1/1981 | Morelock | 51/295 |

FOREIGN PATENT DOCUMENTS 197806  6/1978  Fed. Rep. of Germany ........ 51/309

Primary Examiner—Sam Silverberg
Attorney, Agent, or Firm—Leo I. MaLossi; James C. Davis, Jr.

[57] ABSTRACT

A well-bonded polycrystalline cubic boron nitride body is produced by providing the cubic boron nitride particles with a discontinuous coating of tungsten or molybdenum and then infiltrating them in a mass with molten silicon or silicon-base alloy.

5 Claims, 8 Drawing Figures

POLYCRYSTALLINE SILICON-BONDED CUBIC BORON NITRIDE BODY AND METHOD

This invention relates generally to the art of the fabrication of polycrystalline bodies and is more particularly concerned with a new silicon-bonded polycrystalline cubic boron nitride body, and with a novel method for making such bodies in a wide variety of sizes and shapes.

BACKGROUND OF THE INVENTION

The superhard materials diamond and cubic boron nitride (hereinafter sometimes referred to as CBN) have a wide variety of abrasive and cutting tool uses as well as uses which do not involve the relatively high impact forces incident to grinding and sawing operations. Thus, in applications in which wear resistance is of primary concern such as in conduits for the delivery of sprays of abrasive materials, the matrix of bonding medium may be much more brittle than the impact-resistant resin and metal bonding media generally used. Because of their superior hardness, silicon and silicon-base alloys are preferred as sources of the bonding medium in the fabrication of conduits made of these superhard materials. Efforts heretofore to produce strong and well-bonded compacts (i.e., bonded polycrystalline bodies) of CBN by infiltrating a particulate mass of CBN with molten silicon or an alloy thereof have, however, been unsuccessful, but for one notable exception. That exception is the invention disclosed and claimed in U.S. Pat. No. 4,220,455, assigned to the assignee hereof, in accordance with which superhard particles are given a coating of non-diamond carbon prior to contacting them with molten silicon or silicon-base alloy. Both in the case of diamond particles and that of CBN particles, the non-diamond carbon reacts with molten silicon to form silicon carbide which serves to bond the particles in the resulting mass of metal or alloy, the superhard material ranging in volume from about 1% to 80% of the resulting composite body, according to intended use requirements.

SUMMARY OF THE INVENTION

We have found that well-bonded polycrystalline CBN bodies can be made by a low-pressure, high-temperature process by coating CBN particles with molybdenum or tungsten prior to infiltrating a mass of such coated particles with molten silicon or silicon-base alloy. Further, we have found that it is not necessary to cover the surfaces of the particles entirely or even to more than about 50% to consistently produce these new polycrystalline CBN bodies. It is, however, essential that the molybdenum or the tungsten be on the CBN particles rather than merely being in proximity to these particles. Still further, the molybdenum and tungsten can be used separately or in combination as coatings, that is, molybdenum-coated CBN particles may be admixed with tungsten-coated CBN particles, and CBN particles partially or completely coated with molybdenum and tungsten can be used with consistent success in accordance with this invention. Our findings, however, indicate that the total amount of such coating metal prior to the infiltration should not be less than about 5% nor more than about 20% by weight of the CBN particle mass, the optimum proportion thus being about 10% by weight. When the coating metal is used in accordance with this invention and consequently in conformity with these requirements, the resulting novel polycrystalline product is characterized by the presence of a third phase in the form of a molybdenum or tungsten silicide (or both) precipitate distributed through the silicon bonding medium. Finally, we have found that these new polycrystalline bodies can be made in the size and shape desired within broad limits in a relatively low-pressure, high-temperature environment. Thus, through these discoveries, we have provided an advantageous alternative to the method disclosed in the aforesaid U.S. Pat. No. 4,220,455 and have also invented a new CBN polycrystalline product. Actually, this invention affords even more in that the end product is substantially free from carbides and thus not as subject to impact failure.

Our basic concept, based upon these findings, is that molybdenum or tungsten metal present as a partial or complete coating on the surface of a CBN particle limits reaction between the CBN and molten silicon (or silicon alloy) to the extent that there is no more than the slightest amount of reaction product phase produced at the CBN-silicon interface. This hitherto unknown and unrecognized capability of molybdenum and tungsten coatings we believe to be attributable to the control provided by these metals over the kinetics of such reaction. Thus, the coatings do not serve either as physical barriers or as the bonding media per se, but dissolve in the silicon or silicon-base alloy melt and later precipitate on cooling in the form of the respective silicides. In any event, the ultimate novel and very beneficial result of the application of this phenomenon is real and dramatic as evidenced by the results of our several experiments detailed below.

Although molybdenum and tungsten have been applied in coatings to CBN particles to produce surface modified abrasive particles, there is no disclosure or application therein of the above-described phenomenon.

Briefly described, the new method of this invention includes the steps of applying a coating of molybdenum or tungsten to CBN particles; then placing a mass of the coated particles in a suitable mold cavity and infiltrating the mass of particles with molten silicon or silicon-base alloy with applied pressure at a temperature above 1400° C. When the mold contents have been cooled and the silicon or alloy has solidified, the resulting body is removed with the CBN particles being securely bonded by the silicon or alloy, which is distributed throughout the mass and contains (depending on the coating employed) molybdenum silicide or tungsten silicide in precipitate form.

In its product aspect, this invention is the polycrystalline body prepared by the process of this invention as defined above. Accordingly, the resulting product is a hard, wear-resistant preshaped, bonded polycrystalline article in which, preferably, a major portion (i.e., greater than 50 volume percent) of the volume is cubic boron nitride. In the best practice of this invention, the CBN particle volume fraction of the polycrystalline body is of the order of 65 to 80 v/o. As stated above, the products of this invention include a characteristic third phase in the form of a precipitate of the silicide reaction product of the molybdenum or tungsten coating on the CBN particles. In those instances in which a silicon alloy is employed as the infiltrant, small amounts of silicide of the alloying element may also occur.

DETAILED DESCRIPTION OF THE INVENTION

Figure 1:
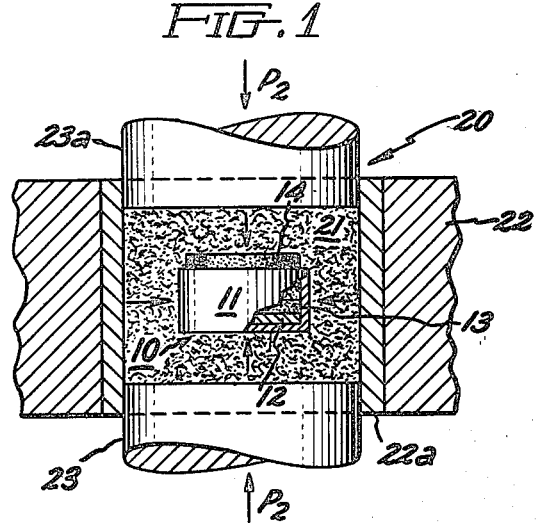
FIG. 1 is a vertical sectional view through an apparatus for applying semi-isostatic pressure to a cell assembly disposed in a finely-divided particulate mass.
Figure 2:
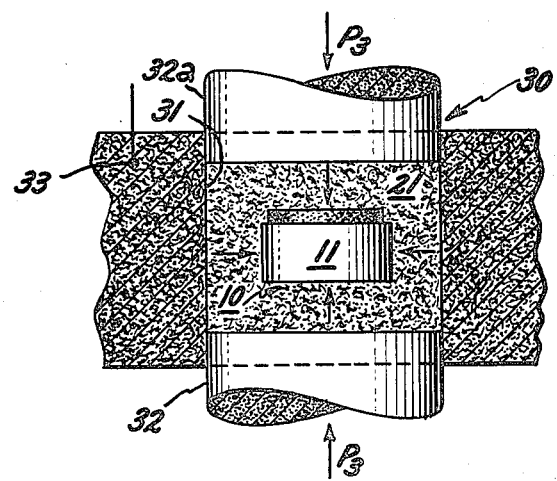
FIG. 2 is a vertical sectional view through a graphite mold for the simultaneous application of heat and pressure to the stabilized geometry of the semi-isostatic system and the cell assembly enclosed therein.

The new bonded polycrystalline CBN products of this invention are made in accordance with the best practice of our present process through the use of the apparatus shown in FIGS. 1 and 2. As disclosed in U.S. Pat. No. 3,982,911, issued Sept. 28, 1976, and assigned to the assignee hereof, the apparatus in FIG. 1 comprises cell assembly 10 consisting of a metal cup 11 (a cylindrical wall complete with bottom wall section) of refractory metal such as zirconium containing a disc 12 of silicon (or appropriate silicon alloy), a mass 13 of CBN particles coated with tungsten, molybdenum, or a mix of such coated particles and a plug 14 of suitable inert material serving as a closure for the assembly.

The CBN particles are preferably size-graded to contain a full size range from less than 1 to 200 microns and are coated with molybdenum or tungsten to the extent of at least 50% to 60% of the surface area thereof by the means and method set out below. Following vibration, consolidation of the CBN powder mixture as disclosed in said U.S. Pat. No. 3,982,911, cell 10 is disposed in pressure mold 20 surrounded by a mass 21 of very fine (about 500 mesh) particles of hexagonal boron nitride providing an approximately isostatic system for the application of pressure whereby the shape and density of the contents of cup 11 are determined. Mold 20, comprising ring 22 and pistons 23 and 23a, is constructed of tool steel. Once a semi-isostatic system has been established within the confines of piston 23, sleeve 22a and piston 23 a pressure of about 90 kpsi is exerted on the system.

The nature of the hexagonal boron nitride containment is such that the fine particles slip over each other and readjust in approximation of a hydrostatic action in response to the uniaxially-applied force and exert pressure over the entire surface of cell 10. It is assumed that the applied pressure is transmitted substantially undiminished to the cell and the prime purpose of this pressure application is to bring about a consolidation which is effective to diminish the size of the voids and maximize the presence of capillary-size voids in the CBN powder mass.

After completion of the above-mentioned semi-isostatic pressure application, either one of the pistons 23, 23a is withdrawn and the consolidated semi-isostatic system 21 is removed from mold 20 and placed in a hole of identical diameter in graphite mold 30, the transferred semi-isostatic system 21 now being contained within the wall of hole 31 between graphite pistons 32 and 32a. The graphite mold is provided with a thermocouple 33 to provide indication of temperature applied to the semi-isostatic system 21. The mold 30, with the system 21 as so contained, is introduced into a conventional hot-pressing furnace (not shown) and while pistons 32 and 32a apply a uniaxial pressure of about 10 kpsi to system 21, the temperature thereof is raised above the melting-point temperature of the silicon or silicon-base alloy bonding medium. Under this combined application of heat and pressure, the molten bonding medium is forced into the region between the CBN crystals and infused through the mass 13 by capillary action, the inner crystalline voids being sufficiently clean and small for that effect to be marked throughout the structure of the mass. The molybdenum or tungsten coating on the particles reacts with the infiltrating silicon forming the respective silicide.

Apparently as a consequence of these latter preferential silicide-forming reactions, there is very little or essentially no reaction of the molten bonding medium with the CBN particle surface being covered completely by a coating of molybdenum or tungsten. The protection on a partially coated CBN particle, which such coating affords, extends to adjoining uncoated surface portions to control the kinetics of reactions between the infiltrating melt and that CBN particle. As a main consequence, there is little or essentially no reaction product along the interface between the silicon or silicon-base alloy and the individual CBN particle. As far as can be determined, the molybdenum or tungsten coating is converted to silicide, which precipitates in the binder phase as the infiltrated particulate mass is cooled. This relatively clean (i.e. relatively free from the products of reaction between CBN and silicon) interface condition is essential to a well-bonded polycrystalline CBN product and thus is characteristic of the novel polycrystalline, silicon-bonded CBN bodies of this invention.

The time involved in infiltration and reaction of the silicon or alloy thereof with the molybdenum- and/or tungsten-coated particulate CBN mass in a mold cavity will generally be relatively short depending, to some extent, on the size of the shaped mixture, but usually will not exceed approximately 15 minutes.

The new polycrystalline, silicon-bonded body of CBN will, in the preferred practice, consist of crystals ranging in size from submicron up to about 200 microns and the proportion of CBN crystals or particles in the polycrystalline body will range upwardly of 50 volume percent and preferably be from about 65 to 80 percent by volume. Further, the bonding medium, which is composed predominately of silicon and silicides, will be substantially uniformly distributed throughout the particulate structure and the polycrystalline body will be substantially pore-free.

A special advantage of this invention is that the polycrystalline silicon-bonded bodies can be produced directly in a greater variety of shapes and sizes. Consequently, it is now possible to produce in as-cast form bodies such as tubes, rings, and certain other complex shapes, which could only be produced heretofore by expensive machining operations.

The product of this invention process (i.e., a body of CBN particles and bonding medium consisting essentially of silicon and silicides) can be used in a variety of ways, for example, it can be brazed or otherwise attached to a suitable support, such as sintered or hot-pressed silicon carbide, silicon nitride, or cemented carbide. These bodies, however, are not contemplated for use in applications which involve significant impact-resistant requirements such as in sawing operations. The difficulty in such applications is the fact that the bonding medium imparting the tensile strength to the polycrystalline structure is much too brittle for such applications.

The coatings of molybdenum or tungsten on the CBN particles used in accordance with the process of this invention are preferably applied in the manner and according to the specific instructions set out in U.S. Pat. No. 4,011,064 assigned to the assignee hereof. The disclosure of the procedures for applying these coatings to CBN particles as set forth in that patent are accordingly incorporated in this specification by reference. The best practice of the present invention in respect to this aspect of the process thus involves the best practice of the invention disclosed and claimed in that patent. Further, silicon alloys useful in the practice of this invention are disclosed in U.S. Pat. No. 4,124,401 and this patent is also incorporated by reference.

Those skilled in the art will gain a further and better understanding of this invention by the following illustrative, but not limiting, examples of this invention as actually carried out in experiments conducted in the laboratory. The CBN particles were commercial varieties manufactured by the General Electric Company:

EXAMPLE I 100- to 120-mesh cubic boron nitride particles were tungsten-coated as described in EXAMPLE I of the U.S. Pat. No. 4,011,064 referenced above and a 900-gram charge of these coated particles was placed in a 0.562 inch diameter zirconium cup on top of a 650-milligram disc of silicon-30% rhenium with the cup being closed by means of a hexagonal boron nitride and cap. The entire cell assembly was then encapsulated in boron nitride powder and cold pressed to 90 kpsi, after which the body was transferred to a graphite die for hot pressing. Hot pressing was carried out as follows: 0° to 1550° C. in 5 minutes at a maximum pressure of 8700 psi, the cell assembly was held at temperature and pressure maxima for one minute and then slow-cooled to room temperature. Examination of a polished cross-section of the resulting bonded polycrystalline product revealed that the individual CBN particles were well-bonded, there being very little damage to their surfaces.

EXAMPLE II

To test the effect of removing the tungsten coating, another similar experiment was carried out in which CBN particles like those of EXAMPLE I were tungsten-coated in accordance with the EXAMPLE I procedure and then one batch of about half of them was subjected to treatment to break off the tungsten coating as brittle flakes which were then gravity separated from the somewhat lighter CBN material. Two cell assemblies were prepared as described in EXAMPLE I, one of tungsten-coated CBN particles and the other of particles from which substantially all the tungsten coating had been removed.

Figure 3:
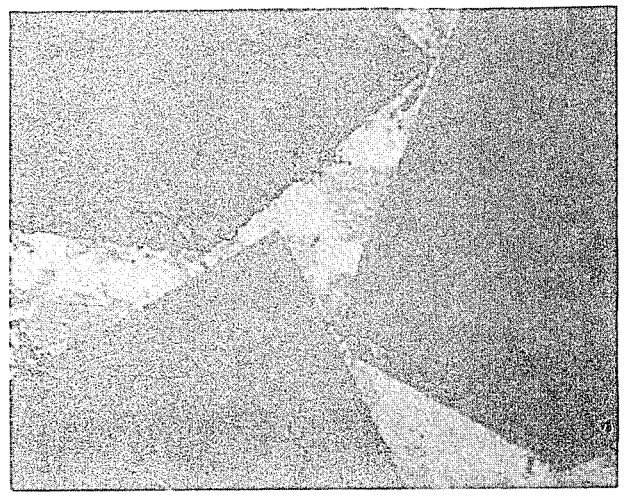
FIG. 3 is a photomicrograph (1400×) of a bonded polycrystalline CBN product of this invention.

On microscopic examination (magnification = 1400×), it was observed that there was only a very thin reaction zone between the particles of tungsten-coated CBN and the infused silicon alloy, while in the case of the other specimen (magnification = 1100×), there was a rather wide reaction zone. These results are shown, respectively, by FIGS. 2 and 3.

EXAMPLE III

The effect of partial coating of tungsten was demonstrated in another experiment like those above in which two compacts were made, one with 8.6 weight percent tungsten coating and the other with 2.7 weight percent tungsten coating. Scanning electron microscopic examination of the CBN particles used to produce the latter compact showed somewhat less than complete coating of the particle surfaces approximating 60 to 75 percent coverage thereof.

Figure 4:
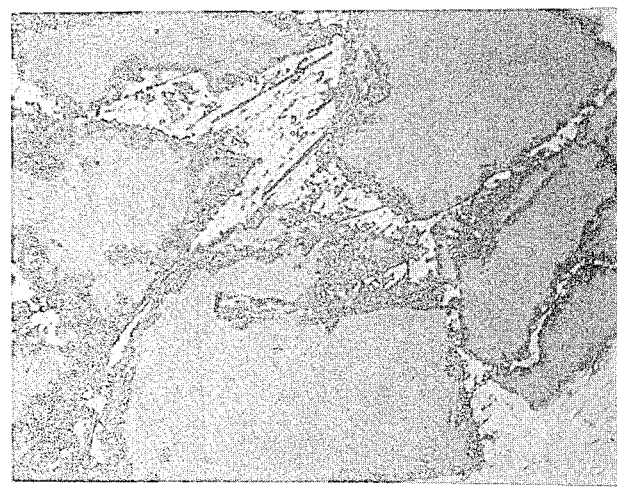
FIG. 4 is a photomicrograph (1100×) of a product without benefit of tungsten or molybdenum coating on the CBN particles.
Figure 5:
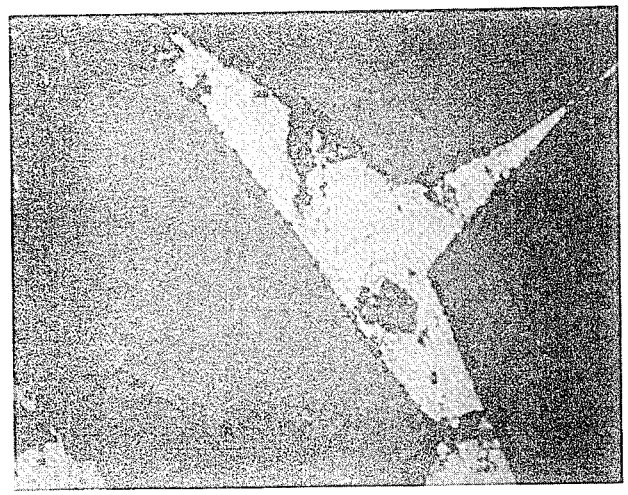
FIG. 5 is a photomicrograph (1400×) of another product of this invention prepared from CBN particles substantially completely coated with tungsten.
Figure 6:
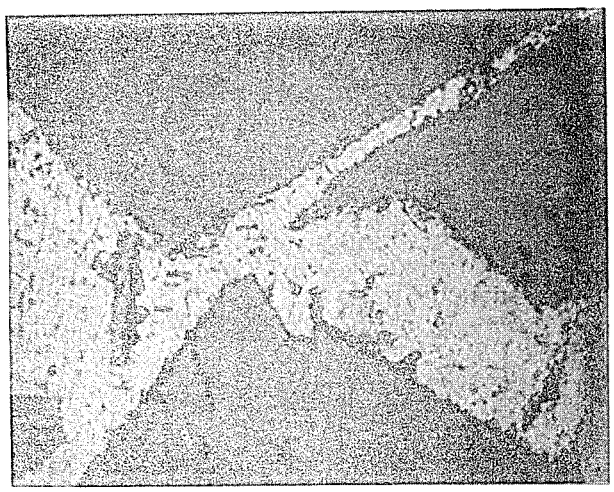
FIG. 6 is a photomicrograph (1400×) of still another product of this invention prepared from CBN particles only partially coated with tungsten.
Figure 7:
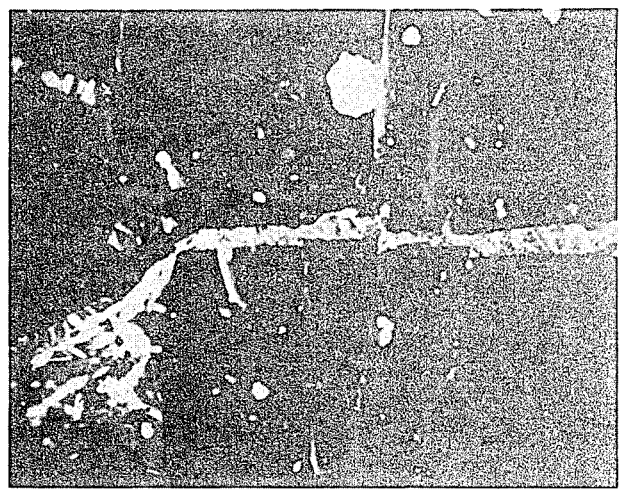
FIG. 7 is a scanning electron photomicrograph (1000×) of the FIG. 5 bonded polycrystalline product showing the tungsten silicide precipitate phase as the light material in the gray-appearing silicon bonding medium.
Figure 8:
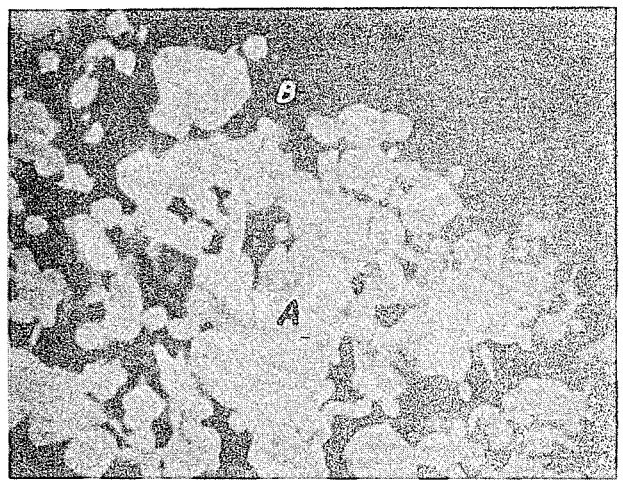
FIG. 8 is a photomicrograph (3000×) like that of FIG. 7 of the bonded polycrystalline product shown therein.

Again, microscopic examination of both polycrystalline bodies (1400×) produced revealed clean bonding interface conditions, that is, very little reaction product in the CBN particle-silicon alloy bonding medium interface zone. The 8.6 weight percent product is illustrated in FIG. 4 while the other is the subject of FIG. 5.

EXAMPLE IV

The effect of using particles of tungsten in admixture with the CBN particles instead of as partial or complete coatings was tested in an experiment carried out generally as described above. Thus, two CBN particle batches were prepared, one being treated with 8.6 weight percent tungsten to provide the particles with a more or less complete coating in each instance, while in the other batch the CBN particles were simply admixed with 8 weight percent tungsten particles about 0.8 micron in size. The compacts of these two batches prepared as described above were on microscopic examination (900×) found to be altogether different from each other. The tungsten-coated CBN particle compact was observed to be well bonded as evidenced by a clean CBN-bonding medium boundary. The other compact, however, exhibited a poor CBN-bonding medium boundary condition fouled with substantive amounts of reaction product material.

EXAMPLE V

Another experiment like that of EXAMPLE I was carried out with one gram of 230/270-mesh tungsten-coated, cubic boron nitride prepared with a tungsten coating as described in the aforesaid U.S. Pat. No. 4,011,064. A 660-milligram silicon-rhenium alloy disc was placed in the bottom of the 0.562-inch diameter zirconium cup as the preliminary step. The cup was closed as described in EXAMPLE I and the entire cell assembly was encapsulated in hexagonal boron nitride powder and cold pressed to 90 kpsi. After transfer of the stabilized mass of cell assembly and hexagonal boron nitride into a graphite die, the mass was subjected to a pressure/heating cycle as described in EXAMPLE I. On removal and sectioning, the polycrystalline product showed the CBN particles to be well infiltrated and bonded in place.

EXAMPLE VI

A disc of silicon-30% rhenium weighing 600 milligrams was placed in the bottom of a zirconium cup as described above. On top of the disc was placed one gram of 325-400 mesh Type I, uncoated CBN. The cup was then closed as also described above and this cell assembly was encapsulated in hexagonal boron nitride powder and cold pressed at 90 kpsi, and then subjected to the pressure/heating cycle as described in EXAMPLE I. The completed polycrystalline CBN body was cross-sectioned and polished and upon examination was found to have been infiltrated by the molten alloy, but the CBN particles had been quite severely damaged at the interfaces with the metal.

EXAMPLE VII

A disc of silicon-22% titanium weighing 136 milligrams was placed in the bottom of a 0.350-inch diameter zirconium cup which was then filled with 325-400 mesh Type I CBN in uncoated condition. After closing the cup as described above, encapsulating the body in hexagonal boron nitride powder and cold pressing to 90 kpsi, the stabilized mass was transferred to a graphite die and subjected to the heating/pressure cycle described in EXAMPLE I. Again, a polished section of the completed polycrystalline CBN body revealed severe damage to the CBN particles.

What we claim as new and desire to secure by Letters Patent of the United States is:

1. A process for producing a bonded polycrystalline cubic boron nitride body of predetermined shape and size which comprises the steps of:
    (a) applying a coating of metal selected from the group consisting of molybdenum and tungsten to a plurality of cubic boron nitride particles covering at least 50 percent of the surface area thereof;
    (b) placing a mass of the coated particles in a mold cavity of size and shape corresponding to the size and shape of the desired bonded polycrystalline body;
    (c) infiltrating said mass of coated particles in the mold cavity under pressure with molten metal selected from the group consisting of silicon and silicon-base alloy;
    (d) cooling the infiltrated mass thereby solidifying the molten metal; and
    (e) recovering the resulting bonded polycrystalline cubic boron nitride body from the mold.

2. The process of claim 1 in which the coating step is carried out so as to substantially entirely cover the surface area of each cubic boron nitride particle.

3. The process of claim 1 in which molybdenum is the coating metal and silicon-30% rhenium alloy is the bonding medium of the system.

4. The process of claim 1 in which tungsten is the coating metal and elemental silicon is the bonding medium of the system.

5. The process of claim 1 wherein the amount of coating metal added to the cubic boron nitride particles is in the range of from about 5 to about 20 weight percent of the mass of cubic boron nitride particles.

* * * * *